US010150519B2

(12) United States Patent
Higgins et al.

(10) Patent No.: US 10,150,519 B2
(45) Date of Patent: Dec. 11, 2018

(54) APPARATUS AND METHOD FOR DESIGNING DECK SILL AND REAR POST

(71) Applicant: TOYOTA MOTOR ENGINEERING & MANUFACTURING NORTH AMERICA, INC., Erlanger, KY (US)

(72) Inventors: Christopher M. Higgins, Ann Arbor, MI (US); James J. Chung, Milan, MI (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 61 days.

(21) Appl. No.: 15/200,865

(22) Filed: Jul. 1, 2016

(65) Prior Publication Data

US 2018/0001938 A1 Jan. 4, 2018

(51) Int. Cl.
*B62D 33/02* (2006.01)
*B62D 33/023* (2006.01)

(52) U.S. Cl.
CPC ........... *B62D 33/02* (2013.01); *B62D 33/023* (2013.01)

(58) Field of Classification Search
CPC ... B62D 25/2054; B62D 33/02; B62D 33/023
USPC .............................................. 296/209, 183.1
See application file for complete search history.

(56) References Cited

U.S. PATENT DOCUMENTS

| 4,136,905 | A | 1/1979 | Morgan |
| 6,092,862 | A | 7/2000 | Kuwahara |
| 7,284,787 | B2 | 10/2007 | McNulty et al. |
| 7,588,285 | B2 | 9/2009 | Mohammed |
| 9,073,586 | B1 | 7/2015 | Courtright et al. |
| 9,126,630 | B1 | 9/2015 | Gallagher et al. |
| 9,145,176 | B1 | 9/2015 | Van Wyk et al. |
| 9,162,715 | B1 | 10/2015 | Marchlewski et al. |
| 2005/0225120 | A1* | 10/2005 | Womack ................ B62D 21/02 296/205 |
| 2005/0236867 | A1* | 10/2005 | McNulty ................ B62D 25/16 296/183.1 |
| 2005/0241152 | A1* | 11/2005 | McNulty ............ B62D 25/2054 29/897.2 |
| 2006/0076804 | A1* | 4/2006 | Ni ...................... B62D 25/2054 296/204 |
| 2006/0082191 | A1* | 4/2006 | McNulty ................ B62D 33/02 296/183.1 |
| 2007/0267896 | A1* | 11/2007 | Werner .................. B62D 33/02 296/203.04 |
| 2010/0109385 | A1 | 5/2010 | Yamada et al. |

(Continued)

*Primary Examiner* — Jason S Morrow
(74) *Attorney, Agent, or Firm* — Oblon, McClelland, Maier & Neustadt, L.L.P.

(57) ABSTRACT

An apparatus and a method for designing a reinforcement structure. The reinforcement structure includes a deck sill with a connecting end, having substantially uniform area moment of inertia throughout a length of the deck sill. Also, the reinforcement structure includes a rear post with a connecting end and a free end, having a varying area moment of inertia, and where the rear post is attached to the deck sill in a substantially perpendicular manner by attaching the connecting end of the deck sill to the connecting end of the rear post forming the reinforcement structure that limits deflection of the free end of the rear post to a target value upon application of a cantilever force at the free end of the rear post.

10 Claims, 9 Drawing Sheets

(56) References Cited

U.S. PATENT DOCUMENTS

| | | | |
|---|---|---|---|
| 2011/0188979 A1* | 8/2011 | Ketels | B60P 1/00 414/519 |
| 2014/0225395 A1* | 8/2014 | Takata | B62D 23/005 296/183.1 |
| 2017/0355281 A1* | 12/2017 | Cardone | B60N 2/015 |
| 2018/0001938 A1* | 1/2018 | Higgins | B62D 25/025 |

* cited by examiner

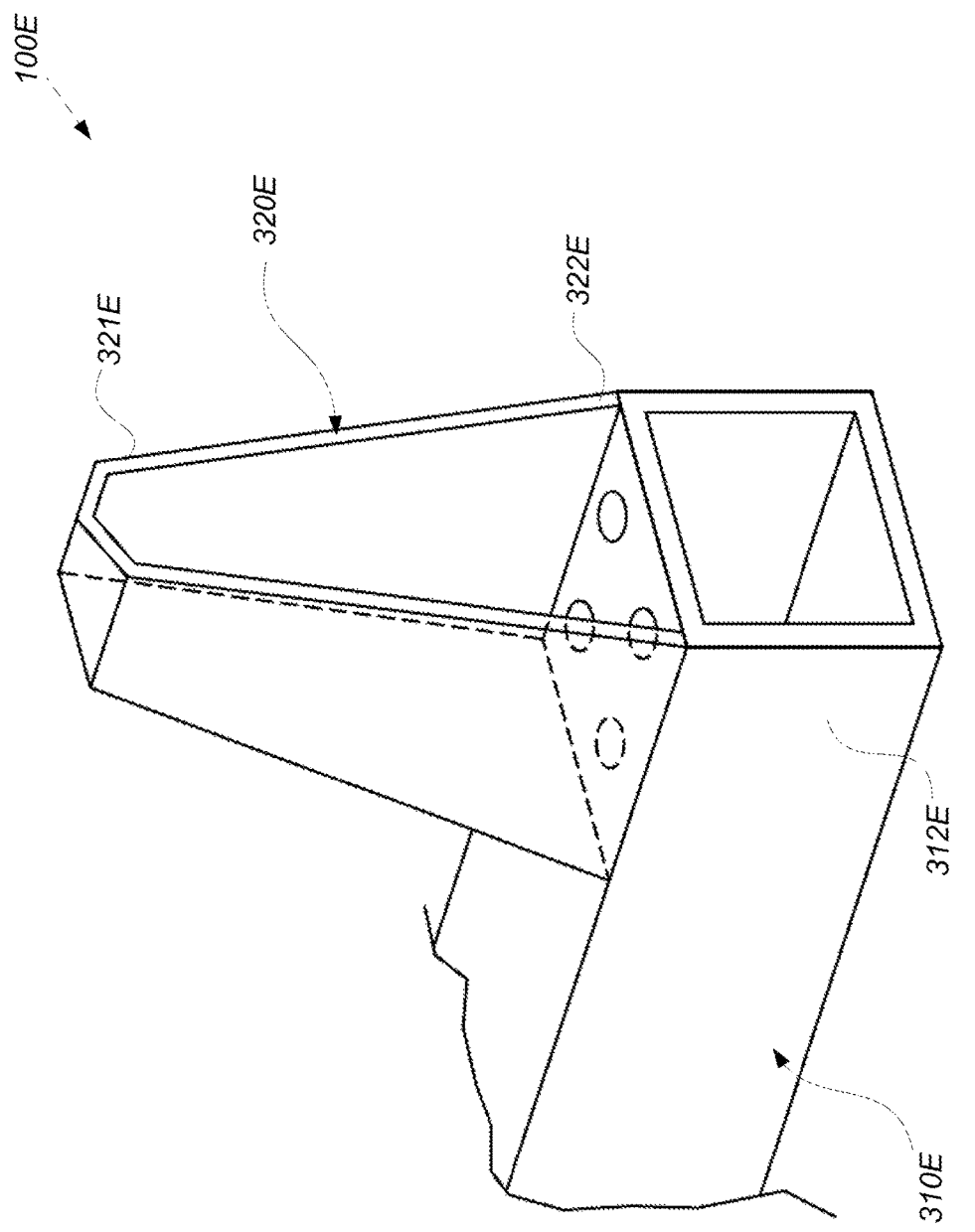

APPARATUS AND METHOD FOR DESIGNING DECK SILL AND REAR POST

BACKGROUND

Field of the Disclosure

This application relates generally to improvements in assemblies for reinforcing components subjected to cantilever forces. More particularly, for reinforcing a portion of components having an L-shaped structure.

Description of the Related Art

Components subjected to heavy loading, vibrations, impact loading, etc. often require reinforcements to sustain an excess loading condition. For instance, such reinforcements are often seen in a rear cargo area of a pickup truck, commonly referred as a box or a deck. Conventionally, the deck includes a flat-bed connected with at least two side panels extending upward therefrom. The deck may be constructed as separate assemblies or can have a unibody structure. Pickup trucks are popular largely because the deck allows them to be utilized in many different ways, including carrying a variety of types of cargo and towing other vehicles. While driving on a road with cargo in the deck, the side panels of the deck may be subjected to cantilever forces, while the bed is subjected to heavy load and/or vibrations. Such loading conditions may cause buckling of the panels.

Conventionally, the side panels of the deck are made from a sheet metal such as steel or aluminum, which may be formed in a draw operation. Characteristics and properties of the steel and aluminum can vary. Aluminum provides a significant weight advantage over steel sheet metals; however the characteristics and properties of aluminum may necessitate additional structural reinforcement. For example, corners of the deck of the pickup truck that are formed from aluminum are typically constructed as separate assemblies; furthermore the deck can also receive tailgate and different types of loads generated by the user or due to motion of the pickup truck. Accordingly, the deck may require reinforcements to meet performance requirements. The performance requirements can also impose structural limitation such as size, shape, weight, deflection under loading, etc. As such, to improve the performance of the pickup truck efficient reinforcement structures may be required.

SUMMARY

According to an embodiment of the present disclosure, there is provided a reinforcement structure. The reinforcement structure includes a deck sill with a connecting end, having a substantially uniform cross-section and a constant area moment of inertia throughout a length of the deck sill. The reinforcement structure also includes a rear post with a connecting end and a free end, having a varying area moment of inertia. The rear post is attached to the deck sill in a substantially perpendicular manner by attaching the connecting end of the deck sill to the connecting end of the rear post forming the reinforcement structure that limits deflection of the free end of the rear post to a target value upon application of a cantilever force at the free end of the rear post.

Further, according to an embodiment of the present disclosure, there is provided a method for designing a reinforcement structure including a deck sill and a rear post. The method includes inputting, using processing circuitry, structural limitations related to the deck sill and the rear post, selecting, using the processing circuitry, a first component with a uniform area moment of inertia and a second component with a varying area moment of inertia. The method further includes applying, using the processing circuitry, the structural limitations to the first component and the second component, and modifying, using the processing circuitry, the first component to maintain uniform area moment of inertia and the second component to maintain the varying area moment of inertia. Furthermore, the method can include assembling, using the processing circuitry, the reinforcement structure by connecting the first component to the second component in a substantially perpendicular manner.

The method can further include determining, using the processing circuitry, a first deflection at a connecting end of the first component, a second deflection at a free end of the second component, and computing a total deflection at the free end of the second component by aggregating the first deflection and the second deflection. Further, the method can include optimizing, using the processing circuitry, a performance parameter of the reinforcement structure to obtain an optimized reinforcement structure, and manufacturing and assembling the optimized reinforcement structure.

The method can further include plotting, using the processing circuitry, data points corresponding to the performance parameter that is optimized, fitting, using the processing circuitry, a curve passing through the data points and extracting, using the processing circuitry, the equation of the curve. Furthermore, determining, using the processing circuitry, a minima of the curve and extracting the area moment of inertia of the first component and the second component corresponding to the minima of the curve.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3E illustrates a fifth deck sill and a fifth rear post of a fifth reinforcement structure according to an exemplary embodiment of the present disclosure.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Furthermore, the terms "substantially," and similar terms generally refer to ranges that include the identified value within a margin of 10% or preferably 5% in certain embodiments, and any values therebetween.

Figure 1:
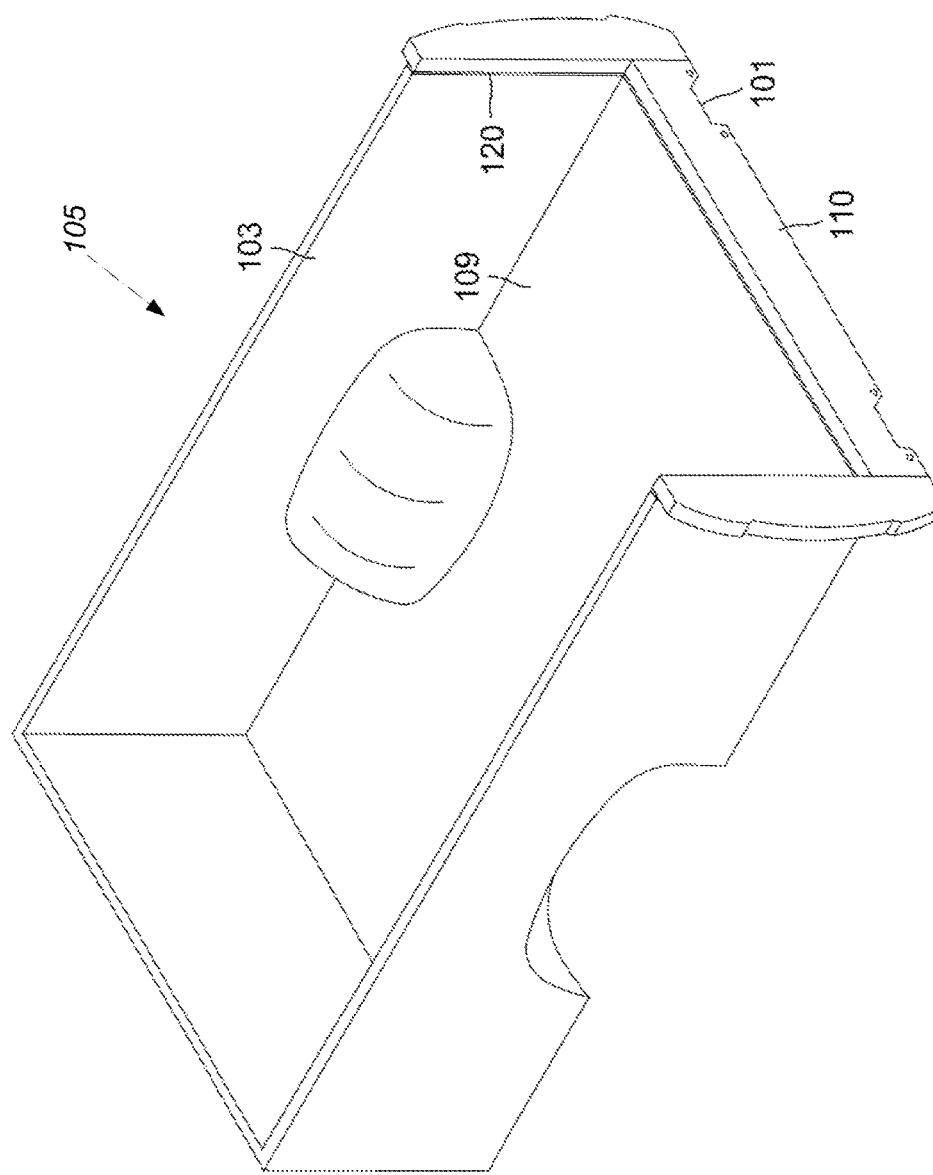
FIG. 1 illustrates a deck sill and a rear post installed in a vehicle according to an exemplary embodiment of the present disclosure.

FIG. 1 illustrates a deck sill and a rear post installed in a vehicle according to an embodiment of the present disclosure. A deck sill 110 can be any structural component used as reinforcement and connected to a component disposed substantially perpendicular to the deck sill 110. In certain embodiments of the present disclosure, the cross-section of the deck sill 110 can be circular, rectangular, square, triangular, I-shaped, X-shaped, L-shaped, open or closed, hollow or solid, etc. A rear post 120 can be any structural component that supports cantilever forces and can be connected to a component disposed substantially perpendicular to the rear post 120. Furthermore, according to the present disclosure, the deck sill 110 is any component with a substantially constant area moment of inertia (area moment of inertia is referred as I-value hereinafter) along the length. The rear post 120 is any component with varying I-value, where I-value increases uniformly or non-uniformly from one end to other of the rear post 120. In another embodiment, the varying I-value can be achieved by varying the cross-sectional area, while the mass per unit length increases as the I-value increases along the length of the rear post 120.

The deck sill 110 can include a notch 101 to accommodate additional components such as chassis, a pipe, etc. that may be a part of a device employing the deck sill 110. The additional component can be in the periphery or can pass through the deck sill 110 or the rear post 120. The notch 101 can cause a decrease in an I-value, which is compensated by attaching a reinforcement element to maintain the I-value of the deck sill 110 constant. The portion of the deck sill 110 having the notch is also referred as a notch portion of the deck sill 110.

The deck sill 110 has a connecting end, which connects to the rear post 120. Similarly, the rear post 120 has a connecting end, which connects to the deck sill 110, and a free end at which a force is applied approximately perpendicular to the rear post 120. The deck sill 110 and the rear post 120 are connected to form a reinforcement structure such that a free end of the rear post 120 satisfies target deflection performance requirement upon application of a force at the free end. In addition, the reinforcement structure has an optimum mass.

The reinforcement structure is formed by connecting one end of the deck sill 110 to the end of the rear post 120 that has relatively higher I-value. The reinforcement structure has an optimized mass and the design process renders different possible shapes and cross-section of the deck sill 110 and the rear post 120. The method of obtaining the reinforcement structure is discussed in detail with respect to FIG. 2. Further, FIGS. 3A to 3E provide exemplary shapes and corresponding connections between the deck sill 110 and rear post 120 to form reinforcement structures 100A-100E, respectively. The deck sill 110 and the rear post 120 can be manufactured as separate components and assembled together to form a unitary construction. Alternatively, the deck sill 110 and the rear post 120 can be manufactured as a unitary structure using various manufacturing processes such as casting, extrusion, forming, stamping, etc.

The deck sill 110 can be attached to a bed 109 of a deck 105 of a truck and the rear post 120 can be attached to the side panel 103. Alternatively or in addition, the deck sill 110 can be disposed under the bed 109 of the deck 105 of a truck, while the rear post 120 can be disposed within the side panel 103. As such, the deck sill 110 and the rear post 120 can be used for external support or internal reinforcements. A similar structure can be installed in all corners of the deck 105.

The deck sill 110 and the rear post 120 structure according to the present disclosure is not limited to automotive applications. The disclosure is applicable to other application such as aerospace, building construction, or any structures experiencing cantilever forces wherein the deck sill 110 and the rear post 120 type of arrangement can provide reinforcements.

Figure 2:
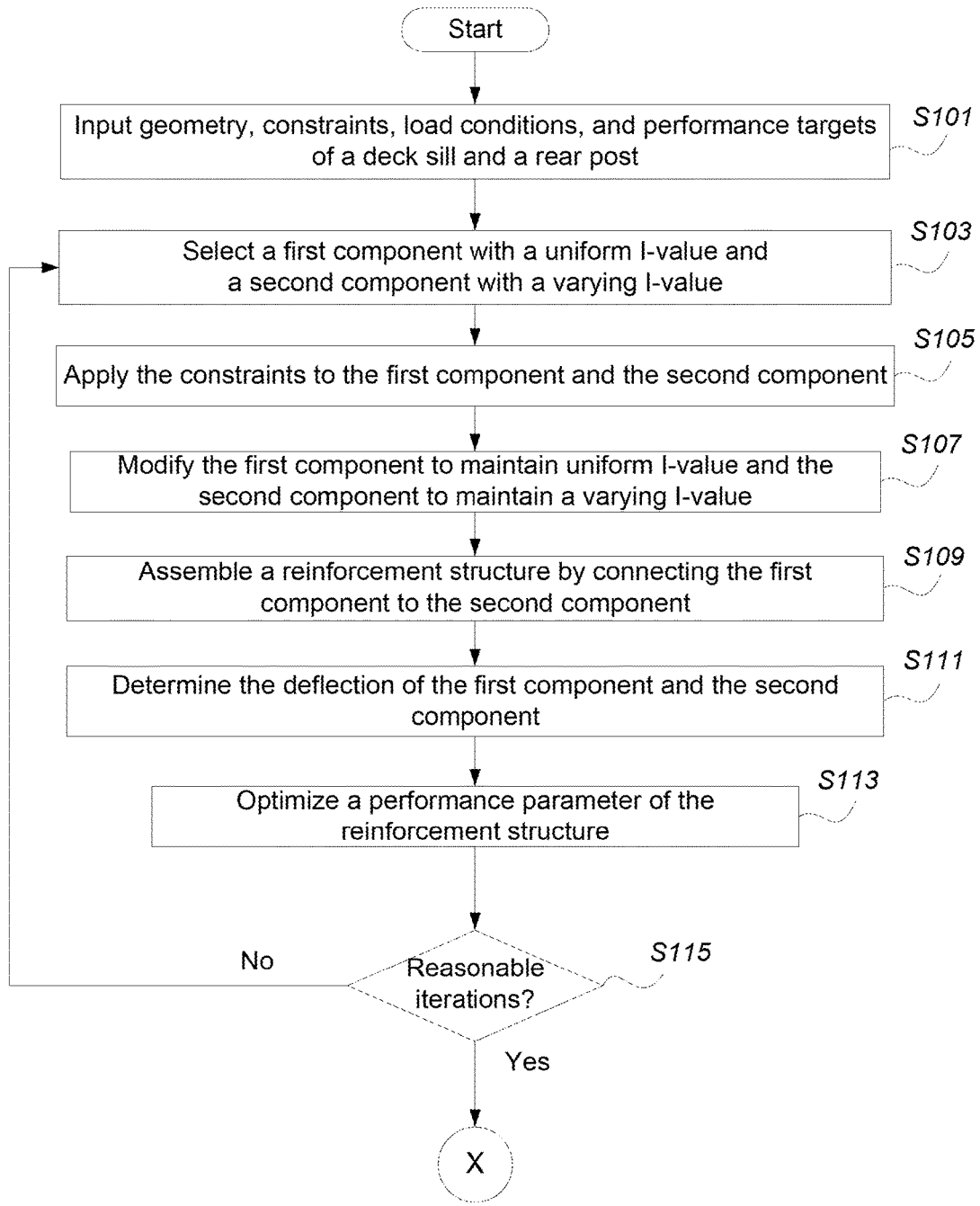
FIG. 2 is a flow chart for obtaining a reinforcement structure including the deck sill and the rear post according to an exemplary embodiment of the present.
Figure 2:
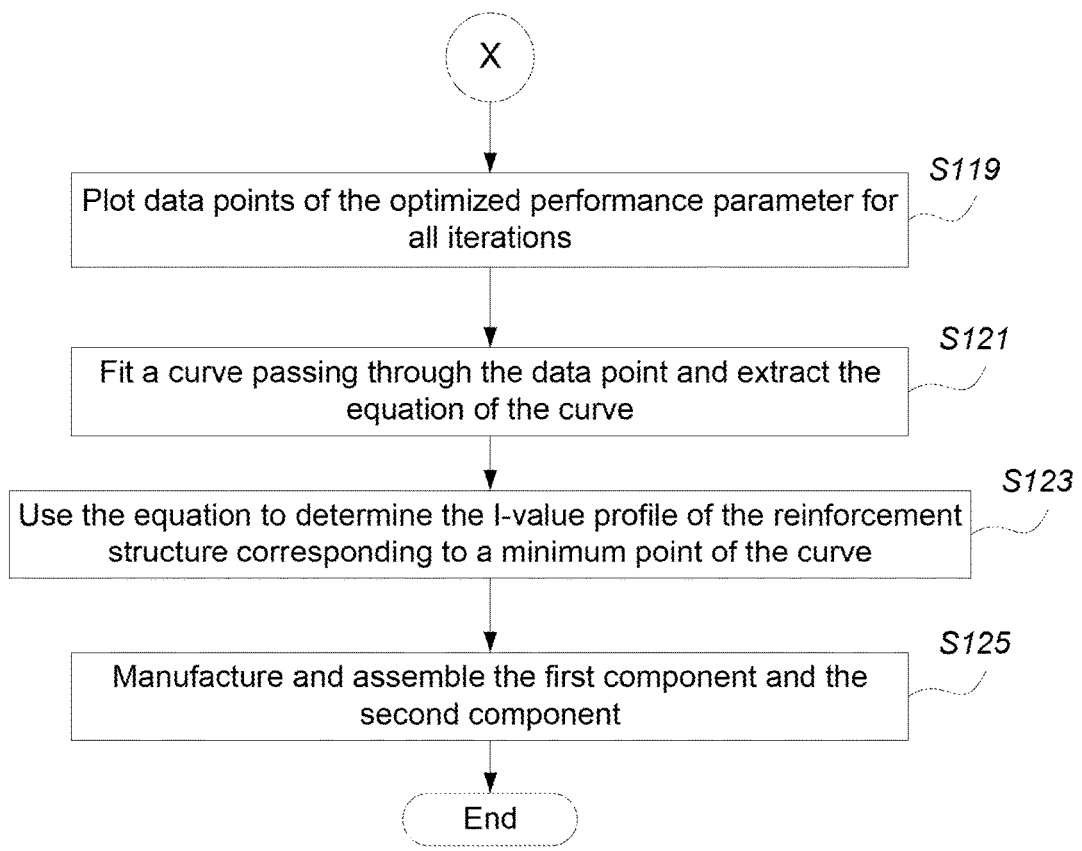

FIG. 2 is a flow chart for obtaining a reinforcement structure including the deck sill 110 and the rear post 120 according to an exemplary embodiment of the present disclosure. In step S101, structural limitations for a deck sill and a rear post are input in processing circuitry such as a CPU 400 of a server 40. The structural limitations can be related to a geometric shape and size, constraints, load conditions, and performance targets. For instance, constraints can arise due to components such as a pipe, a trailer hitch, etc. installed in the vicinity of the deck sill or the rear post. A performance target can be related to mass, maximum allowable deflections or a target deflection of the deck sill and the rear post. Alternatively or in addition, the target deflection can be a parameter related to space limitations experienced during installation of the deck sill 110 and the rear post 120 on the deck of the truck. For example, target deflection of the rear post can be limited due to components such as taillight or electrical wiring in the vicinity of the rear post.

In step S103, a first component with a uniform I-value and a second component with a varying I-value are selected. For example, the first component can have a rectangular cross-section, and the second component can have a tapered shape with a rectangular cross-section. The first component can be any component with a uniform cross-section that can be transformed to manufacture the deck sill (e.g., 310A-310E). The second component can be any component with a uniform or a non-uniform cross-section that can be transformed to manufacture the rear post (e.g., 320A-320E). Profiles of the first component and the second component can be stored in a memory (e.g., a memory 402, or a disk 404) of the server 20. Alternatively or in addition, various geometric shapes of the first component and the second component can be created using computer aided drawing tools (e.g., AutoCAD, CATIA, PROE, AUTO DESK INVENTOR, or other similar drawing tools.) executed on processing circuitry such as the CPU 400 of the server 40. The CPU 400 can also be configured to compute and store I-values of the first component or the second component.

In step S105, the constraints, loading conditions, performance targets are applied to the first component and the second component. Based on the constraints, the first component and/or the second component may include a notch, a hole, a slot, etc. The loading conditions and performance targets can be used in following steps. The step S105 can be executed on processing circuitry such as the CPU 400 of the server 40.

The modifications made to the first component to accommodate the constraints can cause a change in the uniform I-value of the first component in certain portions. As such, in step S107, the first component can be modified to maintain the uniform I-value. The modification can include adding a reinforcement member to compensate for a drop in I-value. Similarly, the second component can be modified to maintain the varying I-value. Furthermore, the performance target requirements may transform the shape of the first component, the second component or a combination thereof. For example, to realize mass saving the cross-section of the first component can be modified from a solid rectangle to a hollow rectangle. The cross-section of the second component can be modified from a closed rectangular cross-section to a hollow U-shaped cross-section with ribs.

In step S109, the first component and the second components are assembled to generate a reinforcement structure. The assembly can be performed using computer aided drawing tools executed on processing circuitry such as the CPU 400 of the server 40. The first component can be connected to the second component using various fastening methods such as bolts, screws, rivets, adhesives, welding, interlocking joints, etc.

In step S111, the deflection of the first component and the second component is determined using processing circuitry such as the CPU 400 of the server 40. The deflection can be measured as an angular deflection (θ) or linear deflection in a vertical direction along y-axis or in a horizontal direction along x-axis. To calculate the deflection a force is applied at the free end of the second component approximately perpendicular to the second component. The deflection resulting due to the force can be calculated using a standard deflection of a beam formula such as equation 1 below, or standard deflection formulas derived for various types of force applications.

$$\frac{d^2 y(x)}{dx^2} = \frac{M(x)}{E(x)I(x)} \quad (1)$$

Where, y(x) is the deflection, M(x) is an internal bending moment of the beam (which can be the first component or the second component), E(x) is the Young's modulus of a material such as steel, cast iron, or aluminum, and I(x) is the area moment of inertia.

Further, the deflection at a connecting end (e.g., ends 312A, 312B, 312C, 312D, or 312E of the present disclosure) of the first component and the deflection at a free end (e.g., ends 321A, 321B, 321C, 321D, or 321E of the present disclosure) of the second component are aggregated to compute a total deflection at the free end of the second component. For example, the deflection at the connection end of the first component can be measured as a first angular deflection $\theta_1$, and the deflection at the free end of the second component can be measured as a second angular deflection $\theta_2$. Then, the total deflection at the free end of the second component can be a sum of $\theta_1$ and $\theta_2$. For accurate measurements, the deflections can be computed using CAD software, finite element method (FEM) software, or by solving the deflection equation analytically. The first deflection, the second deflection and the total deflection can be stored in the database 410 of the server 40 and retrieved as needed, for example, in steps S119, S121, and S123.

In step S113, a performance parameter of the reinforcement structure is optimized. The performance parameter can be the mass of the reinforcement structure, the total deflection of the second component at the free end, a minimum deflection, etc. An optimized mass can be a mass less than a combined mass of the first and the second component selected in step S103, without affecting the target deflection characteristics of the reinforcement structure. Optimization algorithms tailored to the reinforcement structure of the present disclosure can be executed on processing circuitry such as the CPU 400 of the server 40. For example, the second component can have less mass at the free end and comparatively more mass at the connecting end of the second component. Thus, the mass of the reinforcement structure is reduced while the target deflection characteristics are maintained. In one embodiment, the step S107 or sequence of steps S107-S111, can be executed after the step S113 till the performance target is satisfied. The optimum mass or optimum deflection value obtained in step S113 can be stored in the database 410 of the server 40 and retrieved as needed, for example, in steps S119, S121, and S123. Also, the I-values of the first component and the second component can be stored in the database 410. Different structures obtained as a result of mass optimization or deflection optimization are discussed with respect to FIGS. 3A-3E.

In step S115, a determination is made whether a reasonable number of iterations of steps S103 through S113, discussed above, is performed. The reasonable number of iterations can be a predetermined number or a number input by a user. For example, for statistical significance, the predetermined number of iterations can be 30. Alternatively, the user may input the number of iterations as 10 or 100. If the reasonable number of iterations is not performed, the steps S103 through S113 are executed.

After the reasonable number of iterations, in step S119, data points of the optimized performance parameters such as the optimized mass (or a total deflection) are retrieved from the database 410 of the server 40 and the data points are plotted for all iterations. For example, the optimum mass can plotted for each iteration. Alternatively or in addition, the optimum mass can be plotted against the I-value of the first component and the second component. Similarly, for each iteration, the total deflection can be plotted as well.

In step S121, a curve is fitted through all the data points plotted and an equation of the curve is extracted. Generally, a best possible curve can be fitted using known curve fitting techniques. The equation of the curve can be a function of the optimum mass, I-value, and total deflection. In step S123, the equation of the curve is used to determine a minima—a point with minimum value on the curve. The minima of the curve can be determined graphically using the plot. Further, the I-value of the first component and the second component corresponding to the minima can be computed or selected. As such, for an optimum mass, the best possible I-value of the reinforcement structure can be obtained.

In step S125, the first component and the second component obtained from step S123 are manufactured and assembled together to form the reinforcement structure and are ready to be used to reinforce a component of interest.

Figure 3A:
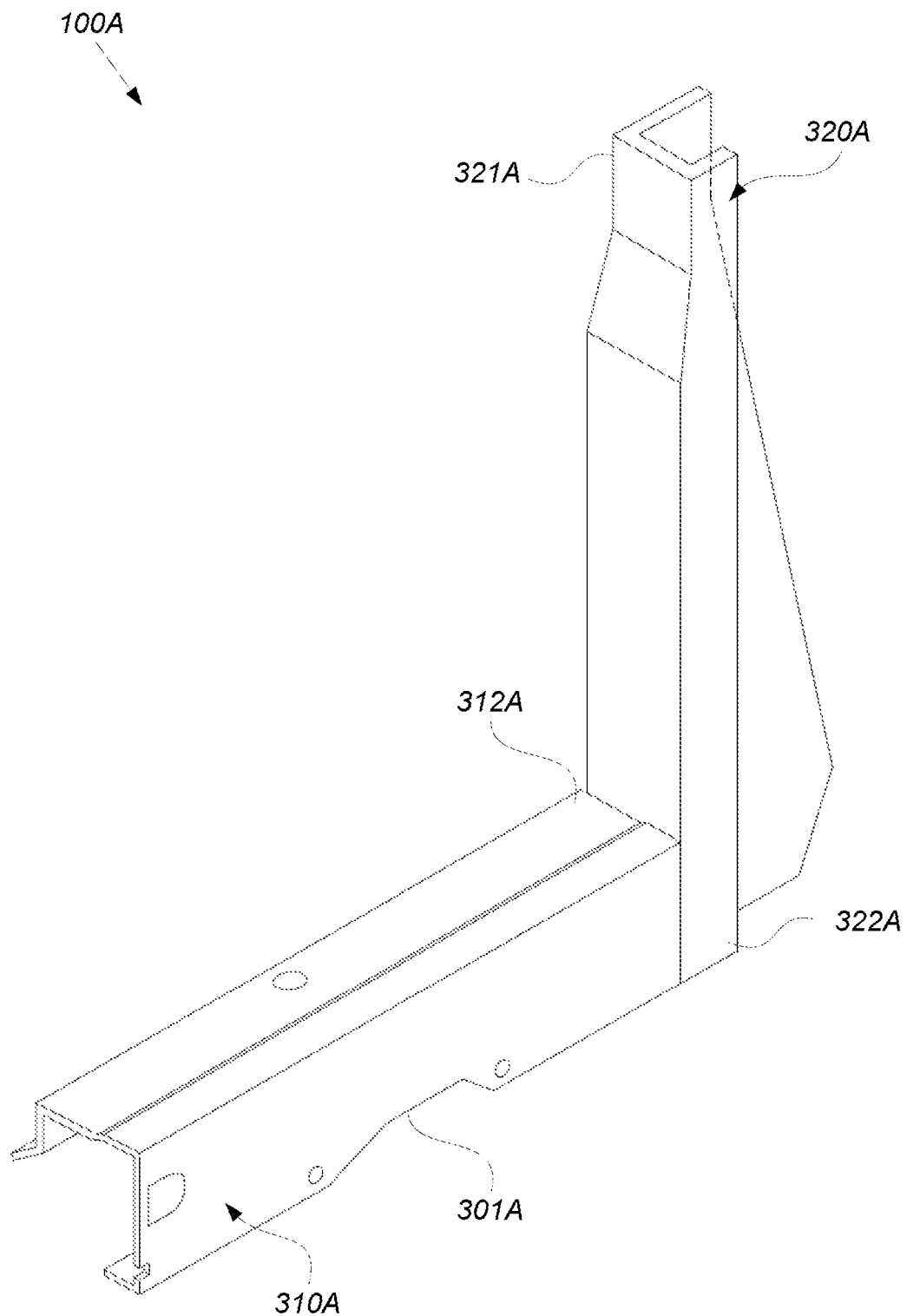
FIG. 3A illustrates a first deck sill and a first rear post of a first reinforcement structure according to an exemplary embodiment of the present disclosure.

FIG. 3A illustrates a first deck sill 310A and a first rear post 320A of a first reinforcement structure 100A according to an exemplary embodiment of the present disclosure. The first deck sill 310A has an open cross-section and a constant I-value along the length. The first deck sill 310A can include a notch 301A to accommodate additional components such as chassis, a pipe, etc. that may be a part of a device employing the first deck sill 310A. The notch 301A can cause a decrease in I-value, which can be compensated by attaching a reinforcement element to maintain I-value of the first deck sill 310A constant. Furthermore, ribs can be included within the open cross-section of the first deck sill 310A to increase the strength and to maintain the shape of the first deck sill 310A. Each of the ribs can be of different thickness having the mass substantially constant or each of the ribs can be of substantially similar thickness having different mass. The first deck sill 310A has a connecting end 312A at which the first rear post 320A can be attached. The connecting end 312A of the first deck sill 310A can include holes, fixtures, slots, etc. to securely attach the first rear post 320A.

The first rear post 320A has varying I-value, where I-value increases from a free end 321A of the first rear post 320A to a connecting end 322A of the first rear post 320A. The free end 321A of the first rear post 320A is an end with relatively lower I-value and at which a force can be applied approximately perpendicular to the first rear post 320A. The connecting end 322A of the first rear post 320A is an end with relatively higher I-value and which connects with the connecting end 312A of the first deck sill 310A. The mass of the first rear post 320A can increase from the free end 321A to the connecting end 322A. A higher mass at the connecting end 322A of the first rear post 320A reduces the deflection of the free end 321A of the rear post 320A upon application of a force perpendicular to the rear post 320A.

The reinforcement structure 100A can be manufactured as a single unit, for example, using casting. However, other manufacturing processes such as extrusion, forming, stamping, etc. can also be used without limiting the scope of the present disclosure.

Figure 3B:
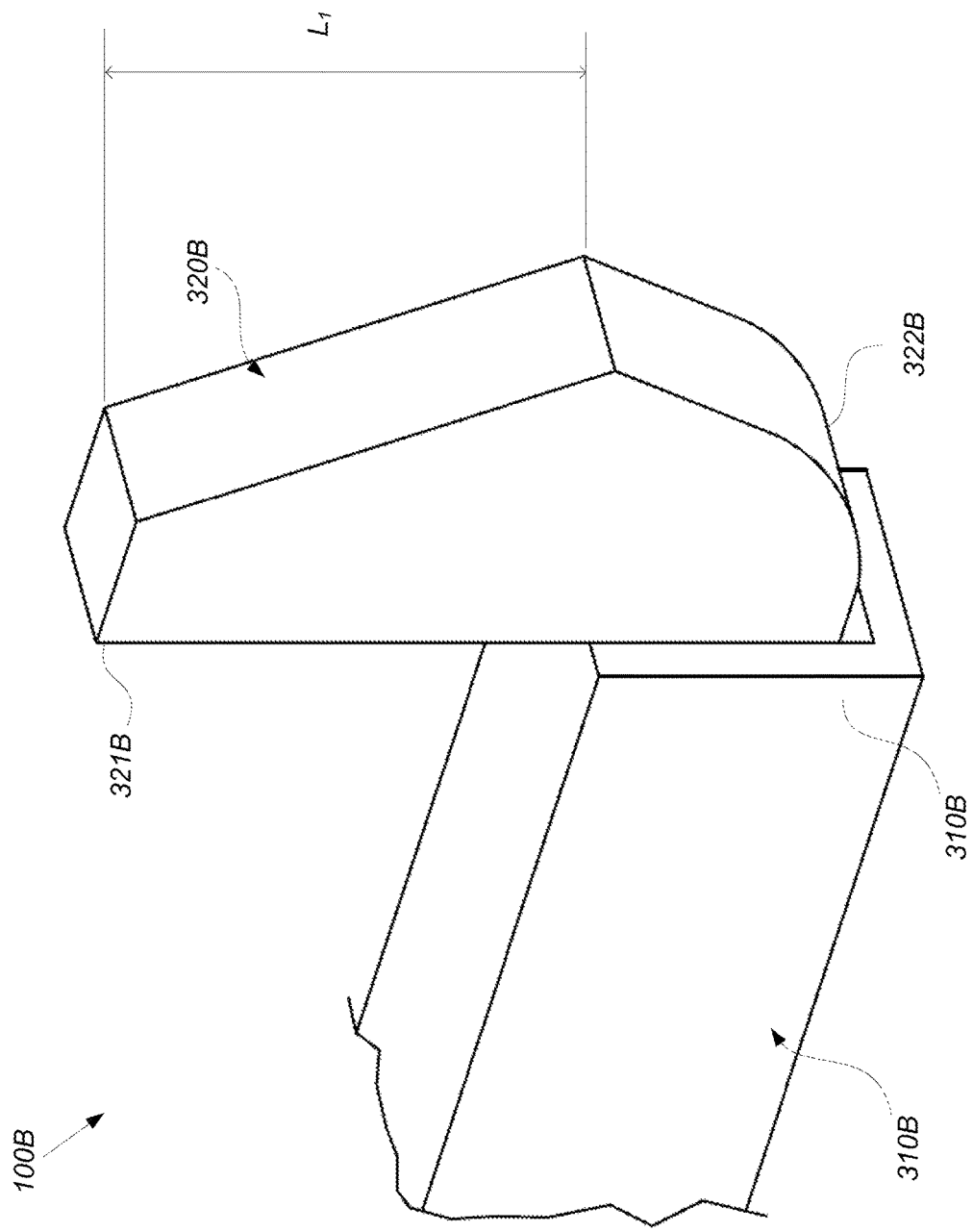
FIG. 3B illustrates a second deck sill and a second rear post of a second reinforcement structure according to an exemplary embodiment of the present disclosure.

FIG. 3B illustrates a second deck sill 310B and a second rear post 320B of a second reinforcement structure 100B according to an exemplary embodiment of the present disclosure. The second deck sill 310B has a rectangular cross-section and a constant I-value along the length. The second rear post 320B has varying the I-value, where the I-value increases from a free end 321B of the second rear post 320B to a connecting end 322B of the second rear post 320B. A side (or a face) of the second rear post 320B that connects with the second deck sill 310B can be flat (or planar), while a non-connecting side of the second rear post 320B can be profile shaped.

The second rear post 320B can have a rectangular cross-section that increases gradually along the length of the second rear post 320B up to length $L_1$; while for the remaining length of the second rear post 320B, the cross-sectional area can include a curvature that gradually decrease the cross-sectional area at the connecting end 322B of the second rear post 320B.

Although the cross-sectional area of the connecting end 322B decreases gradually, the I-value is higher than the I-value of the free end 321B. The mass of the second rear post 320B can increase from the free end 321B to the connecting end 322B. A higher mass and a curved portion of the connecting end 322B of the second rear post 320B reduces the deflection of the free end 321B of the rear post 320B upon application of a force perpendicular to the rear post 320B. Also, the gradually decreasing curved portion of the connecting end 322B of the second rear post 320B decreases the mass of the reinforcement structure 100B.

Figure 3C:
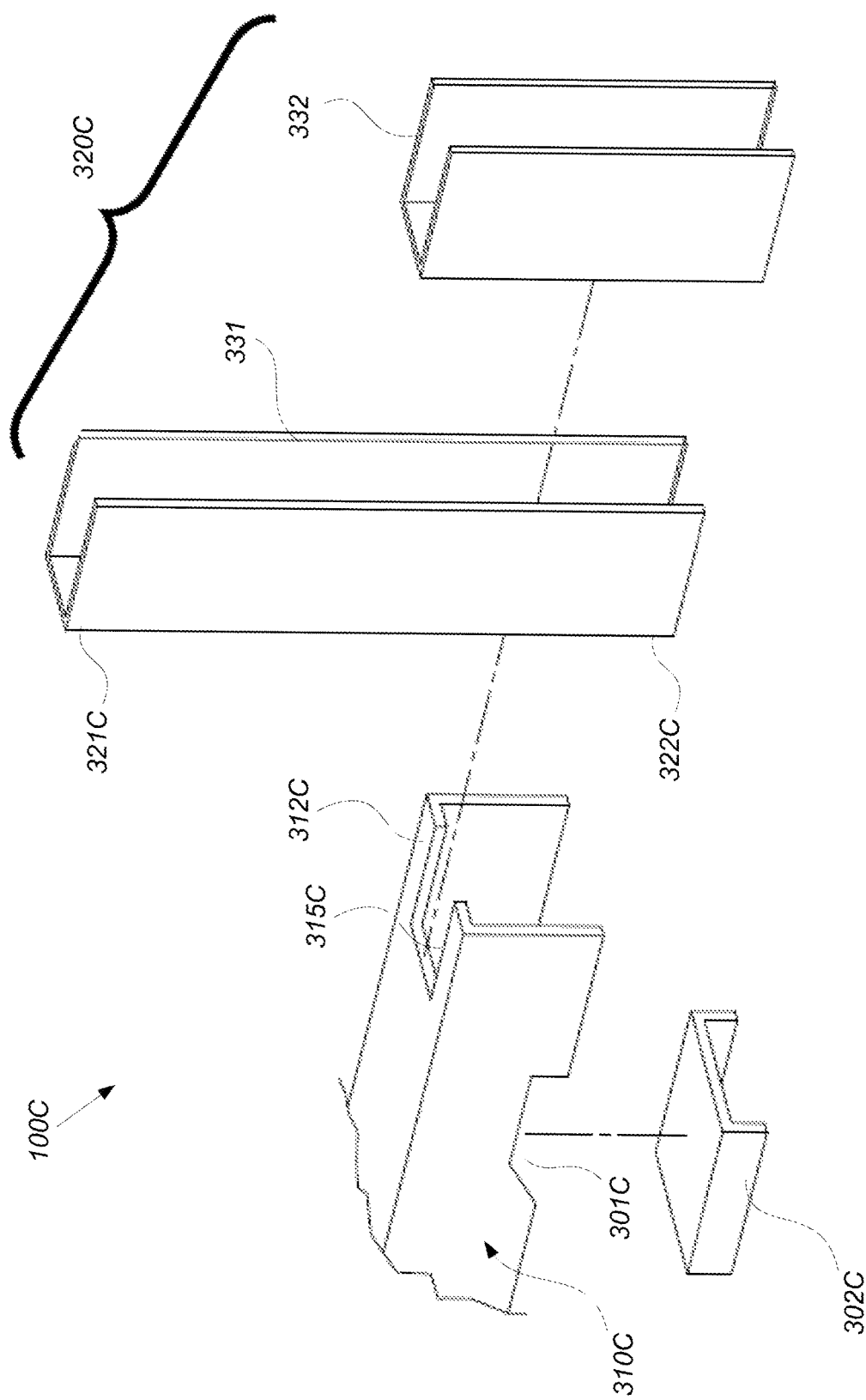
FIG. 3C illustrates a third deck sill and a third rear post of a third reinforcement structure according to an exemplary embodiment of the present disclosure.

FIG. 3C illustrates a third deck sill 310C and a third rear post 320C of a third reinforcement structure 100C according to an exemplary embodiment of the present disclosure. The third deck sill 310C has a U-shaped cross-section forming a channel and a constant I-value along the length. The third deck sill 310C includes a notch 301C to accommodate additional components. The notch 301C causes a local drop in I-value, which is compensated by attaching a U-shaped reinforcement element 302C to maintain the I-value of the third deck sill 310C constant. The reinforcement 302C can be installed inside the channel in a fixed manner, for example, using welding or adhesive. The third deck sill 310C has a connecting end 312C at which the third rear post 320C can be attached. The connecting end 312C of the third deck sill 310C can include a rectangular slot 315C to securely attach the third rear post 320C.

The third rear post 320C has a U-shaped cross-section and a varying I-value along the length. The third rear post 320C can be manufactured by stacking together a plurality of posts 331 and 332 of decreasing length and having similar cross-section. The plurality of posts 331 and 332 are stacked together at the connecting end 322C of the third rear post 320C. As such, the I-value increases gradually from the free end 321C of the third rear post 320C to the connecting end 322C of the third rear post 320C. The third rear post 320C can be inserted and securely fastened in the rectangular slot 315C of the connecting end 312C of the third deck sill 310C. The plurality of posts 331 and 332 can have different cross-sections. For instance, the post 332 can have a solid rectangular or triangular cross-section.

Figure 3D:
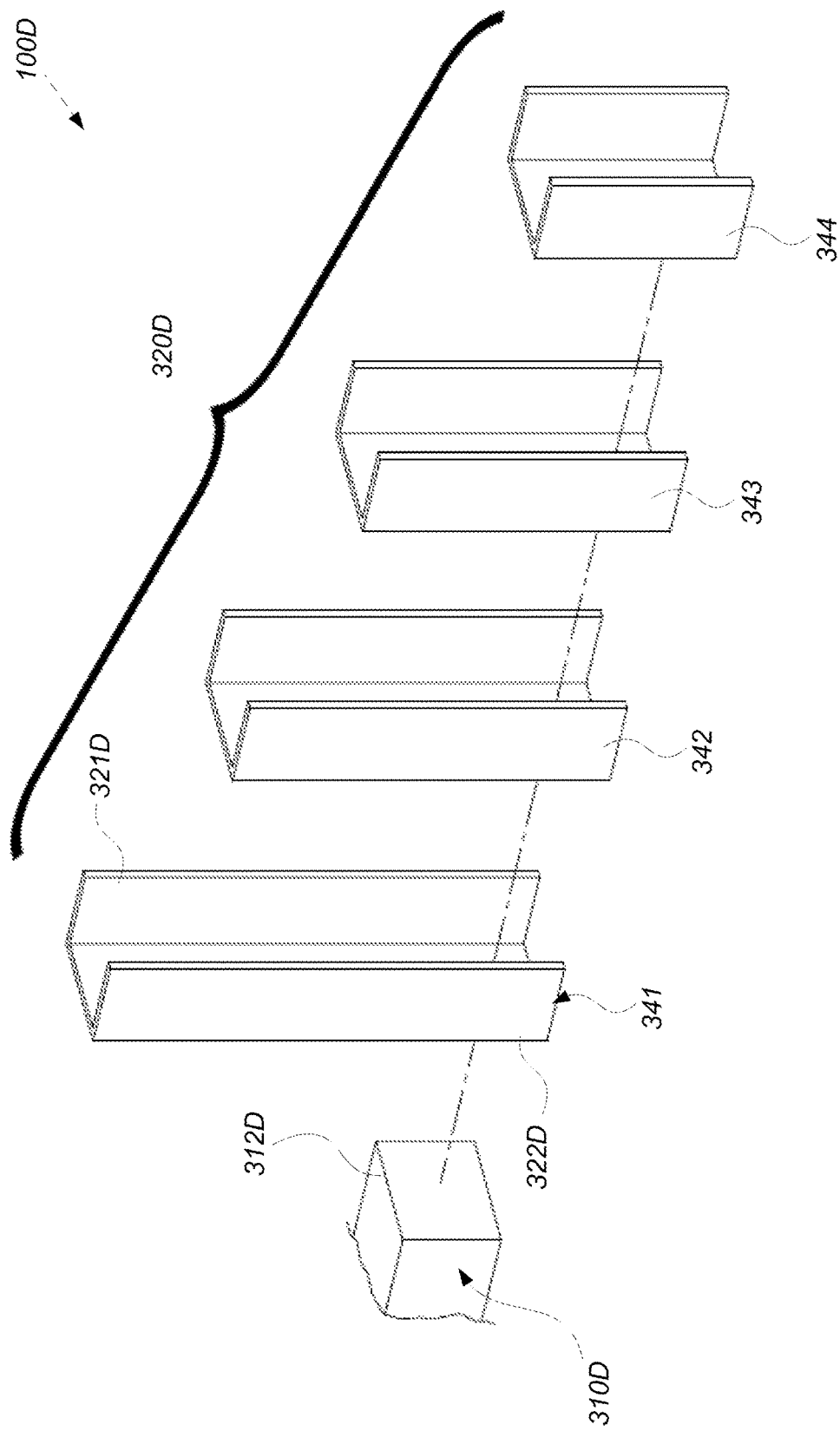
FIG. 3D illustrates a fourth deck sill and a fourth rear post of a fourth reinforcement structure according to an exemplary embodiment of the present disclosure.

FIG. 3D illustrates a fourth deck sill 310D and a fourth rear post 320D of a fourth reinforcement structure 100D according to an exemplary embodiment of the present disclosure. The fourth deck sill 310D has a solid rectangular cross-section with a constant I-value along the length. The connecting end 312D of the fourth deck sill 310D can be attached to the fourth rear post 320D using various fastening methods such as screws, bolts, rivets, welding, etc.

The fourth rear post 320D has a U-shaped cross-section and a varying I-value along the length. The fourth rear post 320D can be manufactured by stacking together a plurality of posts 341, 342, 343, and 344 of decreasing length and having similar cross-section. The plurality of posts 341, 342, 343, and 344 are stacked together at the connecting end 322D of the fourth rear post 320D. As such, the I-value increases gradually from the free end 321D of the fourth rear post 320D to the connecting end 322D of the fourth rear post 320D. The fourth rear post 320D can be inserted and securely fastened to the connecting end 312D of the fourth deck sill 310D. The plurality of posts 341, 342, 343, and 344 can have different cross-sections.

FIG. 3E illustrates a fifth deck sill 310E and a fifth rear post 320E of a fifth reinforcement structure 100E according to an exemplary embodiment of the present disclosure. The fifth deck sill 310E has a rectangular cross-section and a constant I-value along the length.

The fifth rear post 320E has a trapezoidal cross-section and the cross-section area increases along the length of the fifth rear post 320E forming a prism-like pillar. One side of the fifth rear post 320E is straight and planar, while the remaining three sides are slant faces forming a prism-like structure. The fifth rear post 320E has varying I-value, where the I-value increases from a free end 321E of the second rear post 320E to a connecting end 322E of the second rear post 320E. The base of fifth rear post 320E is connected to the top of the fifth deck sill 310E at the connecting ends 322E and 312E, respectively. Further, the planar side of the fifth rear post 320E can be flushed with the connecting end 312E of the fifth deck sill 310E. In one embodiment of the present disclosure, the planar side of the fifth rear post 320E is connected to the fifth deck sill 310E, while the base of the fifth rear post 320E is not in contact with the fifth deck sill 310E and the prism-like structure faces away from the fifth deck sill 310E.

Figure 4:
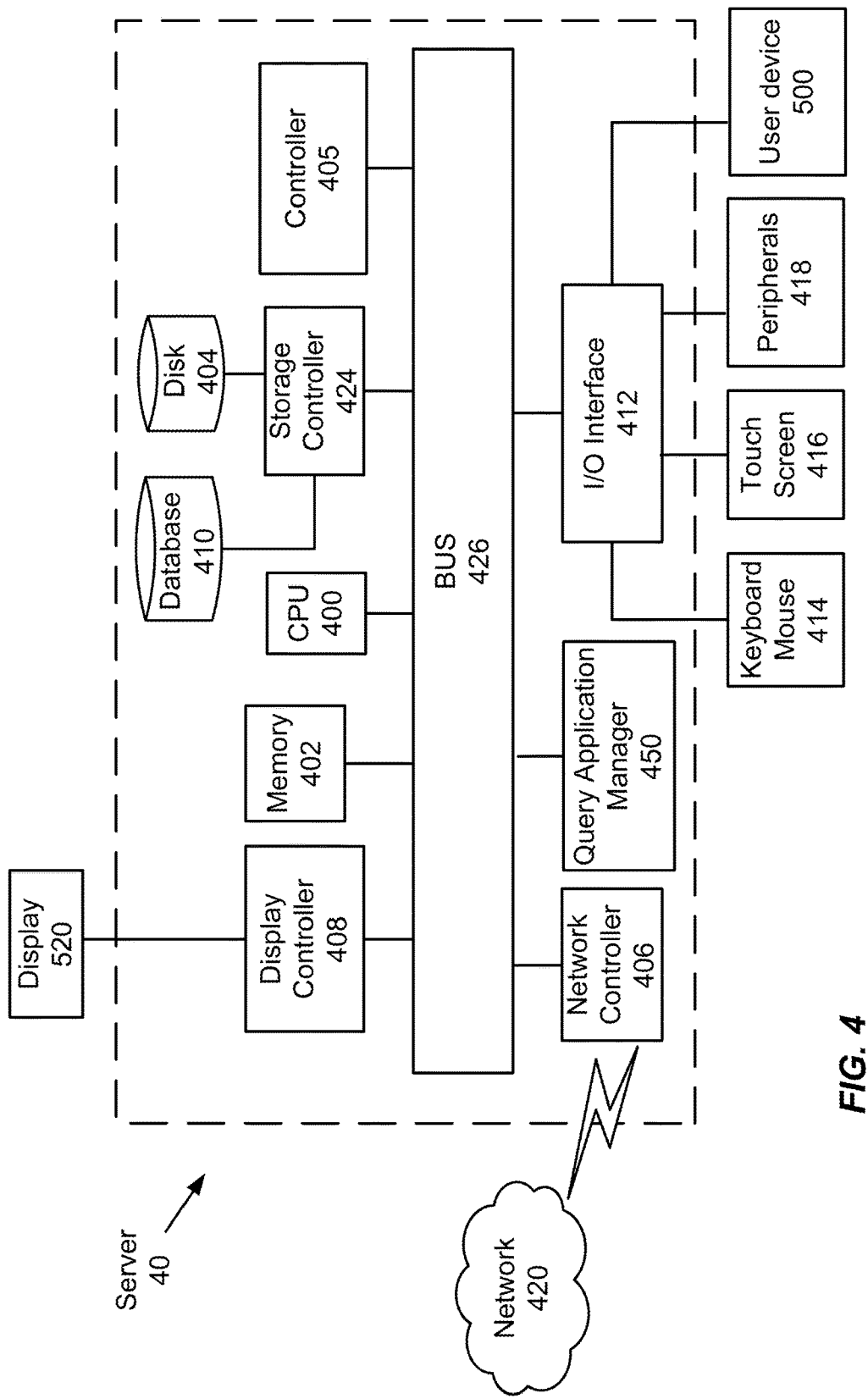
FIG. 4 is a detailed block diagram illustrating hardware of a server according to an exemplary embodiment of the present disclosure.

FIG. 4 is a detailed block diagram illustrating an exemplary sever 40 according to certain embodiments of the present disclosure. In FIG. 4, the sever 40 includes a CPU 400 which can be configured to perform the processes described in the present disclosure with respect to FIG. 2. The process data and instructions may be stored in a memory 402. These processes, instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the sever 40 communicates, such as a server or computer.

Further, the claimed advancements may be provided as a utility application, background daemon, or component of an operating system, or combination thereof, executing in conjunction with CPU 400 and an operating system such as Microsoft Windows 10, UNIX, Solaris, LINUX, Apple MAC-OS and other systems known to those skilled in the art.

The hardware elements, in order to achieve the sever 40, may be realized by various circuitry elements, known to those skilled in the art. For example, CPU 400 may be a XENON or Core processor from INTEL of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above with respect to FIG. 2.

The sever 40, in FIG. 4, also includes a network controller 406, such as an INTEL Ethernet PRO network interface card from Intel Corporation of America, for interfacing with a network 420. As can be appreciated, the network 420 can be a public network, such as the Internet, or a private network such as an LAN or WAN network, or any combination thereof and can also include PSTN or ISDN sub-networks. The network 420 can also be wired, such as an Ethernet network, or can be wireless such as a cellular network including EDGE, 3G and 4G wireless cellular systems. The wireless network can also be WiFi, BLUETOOTH, or any other wireless form of communication that is known. The sever 40 can communicate with external devices such as the user device 500 via the network controller 406.

The sever 40 can further include a display controller 408, such as a NVIDIA GeForce GTX or Quadro graphics adaptor from NVIDIA Corporation of America for interfacing with display 520. The display controller 408 can control a display 520 directly or via the network 420. An I/O interface 412 interfaces with a keyboard and/or mouse 414 as well as a touch screen panel 416 on or separate from the display 520. The I/O interface also connects to a variety of peripherals 418 including printers and scanners. Further, the sever 40 can be connected to a user device 500 such as a smartphone, laptop, touchpad, etc. via the I/O interface 412 or through the network 420. The user device 500 can send queries that are handled by a query application manager 450 including extracting data from the disk 404 or the database 410 via the storage controller 424, from the memory 402, or trigger execution of processes discussed in FIG. 2.

The controller 405 can be used to implement the optimization algorithms and may include one or more CPUs, and may control each element in the user device 500 to perform functions related to communication control, audio signal processing, control for the audio signal processing, still and moving image processing and control, and other kinds of signal processing. The controller 405 may perform these functions by executing instructions stored in a memory 402, for example, the processes illustrated in FIG. 2.

The storage controller 424 connects the storage medium disk 404 or the database 410 with communication bus 426, which may be an ISA, EISA, VESA, PCI, or similar device, for interconnecting all of the components of the sever 40. A description of the general features and functionality of the display 520, keyboard and/or mouse 414, as well as the display controller 408, the storage controller 424, network controller 406, and the I/O interface 412 is omitted herein for brevity as these features are known.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. A reinforcement structure comprising:
   a deck sill with a connecting end, having substantially uniform area moment of inertia throughout a full length of the deck sill; and
   a rear post with a connecting end and a free end, having a varying area moment of inertia, wherein the rear post is connected to the deck sill in a substantially perpendicular manner by attaching the connecting end of the deck sill to the connecting end of the rear post,
   wherein the connected deck sill and the connected rear post form the reinforcement structure that limits deflection of the free end of the rear post to a target value upon application of a cantilever force at the free end of the rear post.

2. The reinforcement structure according to claim 1, wherein the varying area moment of inertia is created by varying cross-section area of the rear post.

3. The reinforcement structure according to claim 2, wherein, the varying cross-section area of the rear post is created by increasing the cross-section from the free end of the rear post to the connecting end of the rear post.

4. The reinforcement structure according to claim 2, wherein the varying area moment of inertia is created by varying a cross-section area from the free end of the rear post to the connecting end of the rear post and including a plurality of ribs, each rib having a substantially constant mass and different thickness, or a substantially constant thickness and different mass.

5. The reinforcement structure according to claim 2, wherein the varying area moment of inertia is created by varying a cross-section area from the free end of the rear post to the connecting end of the rear post while increasing mass per unit length from the free end of the rear post to the connecting end of the rear post.

6. The reinforcement structure according to claim 1, wherein the deck sill is a member attached underneath a bed of a truck and supporting the bed of the truck, and the rear post is a member disposed substantially perpendicular to the deck sill, wherein the rear post acts as a supporting member for a side panel adjacent to the bed of the truck and is disposed inside the side panel.

7. The reinforcement structure according to claim 1, wherein the deck sill includes at least one of a notch, a hole, and a slot to accommodate external components.

8. The reinforcement structure according to claim 7, further including a reinforcement member attached to the deck sill to maintain the uniform area moment of inertia along the full length of the deck sill including the notch.

9. The reinforcement structure according to claim 8, wherein the reinforcement member attached to the deck sill is a rib.

10. The reinforcement structure according to claim 1, wherein the reinforcement structure limits deflection of the connecting end of the deck sill to another target value upon application of a cantilever force at the free end of the rear post.

* * * * *